(12) United States Patent  
Prandl

(10) Patent No.: US 12,513,159 B2
(45) Date of Patent: Dec. 30, 2025

(54) SYSTEM FOR AND METHOD OF DETECTING AN ANOMALY

(71) Applicant: Hyprfire Pty Ltd, West Perth (AU)

(72) Inventor: Stefan Prandl, Victoria Park (AU)

(73) Assignee: HYPRFIRE PTY LTD, West Perth (AU)

(*) Notice: Subject to any disclaimer, the term of this patent is extended or adjusted under 35 U.S.C. 154(b) by 317 days.

(21) Appl. No.: 18/022,493

(22) PCT Filed: Aug. 19, 2021

(86) PCT No.: PCT/AU2021/050916
§ 371 (c)(1),
(2) Date: Feb. 21, 2023

(87) PCT Pub. No.: WO2022/040725
PCT Pub. Date: Mar. 3, 2022

(65) Prior Publication Data
US 2023/0353583 A1    Nov. 2, 2023

(30) Foreign Application Priority Data
Aug. 25, 2020  (AU) ................. 2020903040

(51) Int. Cl.
*H04L 9/40* (2022.01)
(52) U.S. Cl.
CPC ........ *H04L 63/1416* (2013.01); *H04L 63/145* (2013.01)
(58) Field of Classification Search
CPC ................. H04L 63/1416; H04L 63/145
(Continued)

(56) References Cited

U.S. PATENT DOCUMENTS

| 2006/0010389 A1 | 1/2006 | Rooney et al. |
| 2014/0006468 A1* | 1/2014 | Kossovsky ............ G06Q 40/00 |
| | | 708/517 |

(Continued)

FOREIGN PATENT DOCUMENTS

| EP | 3206366 B1 | 11/2018 |
| KR | 20150118186 A | 10/2015 |

OTHER PUBLICATIONS

Prandl et al, "An Investigation of Power Law Probability Distributions for Network Anomaly Detection", IEEE, 2017 (Year: 2017).*

(Continued)

*Primary Examiner* — Thanh T Le
(74) *Attorney, Agent, or Firm* — Miller Nash LLP

(57) ABSTRACT

An anomaly detection system is described for detecting an anomalous event associated with source data. The anomaly detection system comprises a data grouping creator arranged to produce a plurality of data groupings of data elements from a data group of data elements. The data group is obtained from the source data, the data groupings including data elements from the data group and less data elements than the data group, and the source data conforming substantially to a natural power law when an anomalous event is not present. The system also includes a power law goodness of fit tester arranged, for each of at least some of the data group and data groupings, to compare a power law profile obtained from the data group or data grouping with a reference power law profile, and produce a goodness of fit value indicative of a similarity between the power law profile obtained from the data group or data grouping and the reference power law profile. The system also includes a decision system arranged to receive the produced goodness of fit values and output an indication as to whether the (Continued)

produced goodness of fit values are indicative of an anomalous event in the computing system.

22 Claims, 13 Drawing Sheets

(58) Field of Classification Search
USPC .......................................................... 726/22
See application file for complete search history.

(56) References Cited

U.S. PATENT DOCUMENTS

| | | |
|---|---|---|
| 2015/0128263 A1 | 5/2015 | Raugas et al. |
| 2016/0352765 A1 | 12/2016 | Mermoud et al. |
| 2016/0359870 A1* | 12/2016 | Gu .......................... G06F 21/564 |
| 2019/0149565 A1 | 5/2019 | Hagi et al. |
| 2020/0059484 A1* | 2/2020 | Rhee .................. G05B 19/4186 |
| 2020/0128040 A1* | 4/2020 | Lazarescu ........... H04L 63/1425 |
| 2020/0258004 A1 | 8/2020 | Heimann et al. |

OTHER PUBLICATIONS

Sun et al., Detection and Classification of Malicious Patterns in Network Traffic Using Benford's Law, Proceedings of APSIPA Annual Summit and Conference 2017 (Year: 2017).*

PCT International Search Report and Written Opinion of the International Searching Authority issued in International Application No. PCT/AU2021/050916, mailed Sep. 23, 2021, 13 pages.

Extended European Search Report issued in European Patent Application No. 21859393.7, mailed Sep. 17, 2024, 11 pages.

* cited by examiner

SYSTEM FOR AND METHOD OF DETECTING AN ANOMALY

CROSS-REFERENCE TO RELATED APPLICATIONS

This application is a national stage filing under 35 U.S.C. § 371 of International Application No. PCT/AU2021/050916, filed Aug. 19, 2021, entitled "A SYSTEM FOR AND METHOD OF DETECTING AN ANOMALY," and claims priority from Australian Provisional Patent Application No. 2020903040, filed Aug. 25, 2020, the disclosures of both of which are incorporated herein by reference in their entirety.

FIELD OF THE INVENTION

The present invention relates to a system for and method of detecting an anomaly, and in particular to a system for and method of detecting an anomaly in a computing device.

BACKGROUND OF THE INVENTION

Anomaly detection systems based on determining a difference between normal behaviour and abnormal, such as malicious, behaviour are known.

For example, an anomaly detection system may be used to detect a malware event. 'Malware' can be defined as any malicious software that is intentionally designed to disrupt, damage, or gain unauthorized access to a computer system. Examples of malware include computer viruses, worms, trojan horses, ransomware, adware, scareware and spyware.

While an anomaly detection system, in this example antivirus software, may be used to prevent and/or detect an anomaly, successful detection of an anomaly typically relies on prior knowledge of the specific characteristics of the anomaly in order to detect the infection, and therefore continual updating of the system knowledge is required to keep up to date with current known anomalies. However, for new types of anomaly or known types of anomaly with new characteristics not known to the anomaly detection system, such strategies are less successful.

SUMMARY OF THE INVENTION

According to a first aspect of the invention, there is provided an anomaly detection system for detecting an anomalous event associated with source data, the anomaly detection system comprising:
  a data grouping creator arranged to produce a plurality of data groupings of data elements from a data group of data elements, the data group obtained from the source data, the data groupings including data elements from the data group and less data elements than the data group, and the source data conforming substantially to a natural power law when an anomalous event is not present;
  a power law goodness of fit tester arranged, for each of at least some of the data group and data groupings, to:
    compare a power law profile obtained from the data group or data grouping with a reference power law profile; and
    produce a goodness of fit value indicative of a similarity between the power law profile obtained from the data group or data grouping and the reference power law profile; and
  a decision system arranged to receive the produced goodness of fit values and output an indication as to whether the produced goodness of fit values are indicative of an anomalous event in the computing system.

In an embodiment, the power law profile obtained from the data group or data grouping is a Zipf's Law profile and the reference power law profile is a reference Zipf's Law profile, such as an ideal Zipf's Law profile.

In an embodiment, the power law profile obtained from the data group or data grouping is a Benford's Law profile and the reference power law profile is a reference Benford's Law profile, such as an ideal Benford's Law profile.

In an embodiment, the system is arranged, for each of at least some of the data group and data groupings, to:
  compare a Benford's Law profile obtained from a first digit of data elements in the data group or data grouping with a reference Benford's Law profile; and
  produce a goodness of fit value indicative of the similarity between the Benford's Law profile obtained from the first digit of the data elements in the data group or data grouping and the reference Benford's Law profile;
  compare a Benford's Law profile obtained from at least one other digit of the data elements in the data group or data grouping with a reference Benford's Law profile; and
  produce a goodness of fit value indicative of the similarity between the Benford's Law profile obtained from the at least one other digit of the data elements in the data group or data grouping and the reference Benford's Law profile.

In an embodiment, the system is arranged, for each of at least some of the data group and data groupings, to:
  compare multiple power law profiles obtained from the data group or data grouping with respective reference power law profiles; and
  produce a goodness of fit value indicative of the similarity between each power law profile obtained from the data group or data grouping and the respective reference power law profile.

In an embodiment, the system is arranged, for each of at least some of the data group and data groupings, to:
  compare a Zipf's Law profile obtained from the data group or data grouping with a reference Zipf's Law profile;
  produce a goodness of fit value indicative of the similarity between the Zipf's Law profile obtained from the data group or data grouping and the reference Zipf's Law profile;
  compare a Benford's Law profile obtained from the data group or data grouping with a reference Benford's Law profile; and
  produce a goodness of fit value indicative of the similarity between the Benford's Law profile obtained from the data group or data grouping and the reference Benford's Law profile.

In an embodiment, the data grouping creator is arranged to produce multiple sets of data groupings, each set of data groupings including a different number of data groupings.

In an embodiment, the data grouping creator is arranged to produce multiple sets of data groupings, each data grouping in a set of data groupings including a different number of data elements than the data groupings in other sets of data groupings.

In an embodiment, the data groupings in each set of data groupings have the same number of data elements.

In an embodiment, the data elements in each data grouping of a set of data groupings are different.

In an embodiment, the data grouping creator is arranged to produce 9 sets of data groupings from the data group, wherein:
a first set of data groupings includes 2 data groupings;
a second set of data groupings includes 5 data groupings;
a third set of data groupings includes 10 data groupings;
a fourth set of data groupings includes 20 data groupings;
a fifth set of data groupings includes 50 data groupings;
a sixth set of data groupings includes 100 data groupings;
a seventh set of data groupings includes 200 data groupings;
an eighth set of data groupings includes 500 data groupings;
a ninth set of data groupings includes 1000 data groupings.

In an embodiment, the data group includes 10,000 data elements.

In an embodiment, the source data is data indicative of characteristics of network packets, such as network packet inter-arrival times or network packet length.

In an embodiment, the network packets are TCP and/or UDP packets.

In an embodiment, the source data is data indicative of characters in at least one computer log.

In an embodiment, the source data is indicative of characters in a plurality of computer logs, which characters may be derived from one computing device or multiple computing devices.

In an embodiment, when the decision system indicates that an anomalous event exists, the decision system is also arranged to output an indication as to the type of anomalous event using the produced goodness of fit values.

In an embodiment, the decision system is arranged to determine whether an anomalous event exists using thresholding.

In an embodiment, the decision system is arranged to determine whether an anomalous event exists using decision trees, or a random forest.

In an embodiment, the decision system is arranged to determine whether an anomalous event exists using a machine learning system and/or neural network that is trained to recognise patterns in the goodness of fit values that are indicative of normal source data and patterns in the goodness of fit values that are associated with an anomalous event.

In an embodiment, the decision system is arranged to recognise specific patterns of goodness of fit values that are indicative of specific types of anomalous event.

In an embodiment, the anomaly detection system is arranged to process successive data groups of data elements from the source data and, for each data group and data grouping associated with the data group, to:
compare a power law profile obtained from the data group or data grouping with a reference power law profile; and
produce a goodness of fit value indicative of the similarity between the power law profile obtained from the data group or data grouping and the reference power law profile.

In an embodiment, the decision system is arranged to determine whether an anomalous event exists after several data groups have been processed based on the produced goodness of fit values for all processed data groups.

In an embodiment, the power law goodness of fit tester is arranged to use a Watson's goodness of fit test to produce goodness of fit values.

In an embodiment, the anomalous event is a malware event.

In accordance with a second aspect of the present invention, there is provided an anomaly detection system for detecting an anomalous event associated with source data, the source data conforming substantially to a natural power law when an anomalous event is not present, the anomaly detection system comprising:
a data grouping creator arranged to obtain successive data groups of data elements from the source data and, for each data group, to produce a plurality of data groupings of data elements from the data group;
a power law profile creator arranged to produce a power law profile from data elements in each data grouping;
a power law goodness of fit tester arranged to produce a set of goodness of fit values for each data group by comparing the power law profile obtained from each data grouping with a reference power law profile, each goodness of fit value indicative of the similarity between the power law profile obtained from the data grouping and the reference power law profile;
a distribution generator arranged to produce a statistical distribution for each data group using the set of goodness of fit values obtained from the data groupings associated with the data group;
a distribution similarity generator arranged to produce a similarity value indicative of a similarity between a first statistical distribution associated with a first data group and a second statistical distribution associated with a different second data group; and
an anomaly determiner arranged to determine whether an anomalous event is likely to exist using the similarity value.

In an embodiment, the second data group is a data group immediately preceding the first data group in the source data.

In an embodiment, the power law profile obtained from each data grouping is a Zipf's Law profile.

In an embodiment, the power law profile obtained from each data grouping is a Benford's Law profile.

In an embodiment, the number of data elements in each data grouping is the same.

In an embodiment, the data elements in the data groupings of a data group are different.

In an embodiment, the source data includes data indicative of at least one characteristic of network packets.

In an embodiment, the data indicative of at least one characteristic of network packets includes network packet inter-arrival times or network packet length.

In an embodiment, the power law goodness of fit tester is arranged to use a Watson's goodness of fit test to produce goodness of fit values.

In an embodiment, the reference power law profile is an ideal power law profile.

In an embodiment, the distribution similarity generator is arranged to produce a similarity value indicative of a similarity between a first statistical distribution associated with a first data group and a second statistical distribution associated with a different second data group using a Kolmogorov-Smirnov (K-S) test.

In an embodiment, the statistical distribution is a probability distribution.

In an embodiment, the anomaly determiner is arranged to determine whether an anomalous event is likely to exist by comparing the similarity value with a threshold value.

In accordance with a third aspect of the present invention, there is provided a network router including an anomaly detection system according to the first and/or second aspect of the present invention.

In accordance with a fourth aspect of the present invention, there is provided a computer program arranged when loaded into a network router or a computing system to cause the network router or computing system to operate according to an anomaly detection system according to the first and/or second aspect of the present invention.

In accordance with a fifth aspect of the present invention, there is provided a method of detecting an anomalous event, the method comprising:
  producing a plurality of data groupings of data elements from a data group of data elements, the data group obtained from source data, the data groupings including data elements from the data group and less data elements than the data group, and the source data conforming substantially to a natural power law when an anomalous event is not present;
  for each of at least some of the data group and data groupings:
    comparing a power law profile obtained from the data group or data grouping with a reference power law profile; and
    producing a goodness of fit value indicative of the similarity between the power law profile obtained from the data group or data grouping and the reference power law profile; and
  using a decision system to receive the produced goodness of fit values and output an indication as to whether the produced goodness of fit values are indicative of an anomalous event in the computing system.

In accordance with a sixth aspect of the present invention, there is provided a method of detecting an anomalous event associated with source data, the source data conforming substantially to a natural power law when an anomalous event is not present, the method comprising:
  obtaining successive data groups of data elements from the source data and, for each data group, producing a plurality of data groupings of data elements from the data group;
  producing a power law profile from data elements in each data grouping;
  producing a set of goodness of fit values for each data group by comparing the power law profile obtained from each data grouping with a reference power law profile, each goodness of fit value indicative of the similarity between the power law profile obtained from the data grouping and the reference power law profile;
  producing a statistical distribution for each data group using the set of goodness of fit values obtained from the data groupings associated with the data group;
  producing a similarity value indicative of a similarity between a first statistical distribution associated with a first data group and a second statistical distribution associated with a different second data group; and
  determining whether an anomalous event is likely to exist using the similarity value.

BRIEF DESCRIPTION OF DRAWINGS

The present invention will now be described, by way of example only, with reference to the accompanying drawings, in which.

DESCRIPTION OF AN EMBODIMENT OF THE INVENTION

The following embodiments of the present invention are described in relation to a computing environment wherein source data used to determine whether an anomaly exists is associated with a computing environment, although it will be understood that other implementations are possible.

Figure 1:
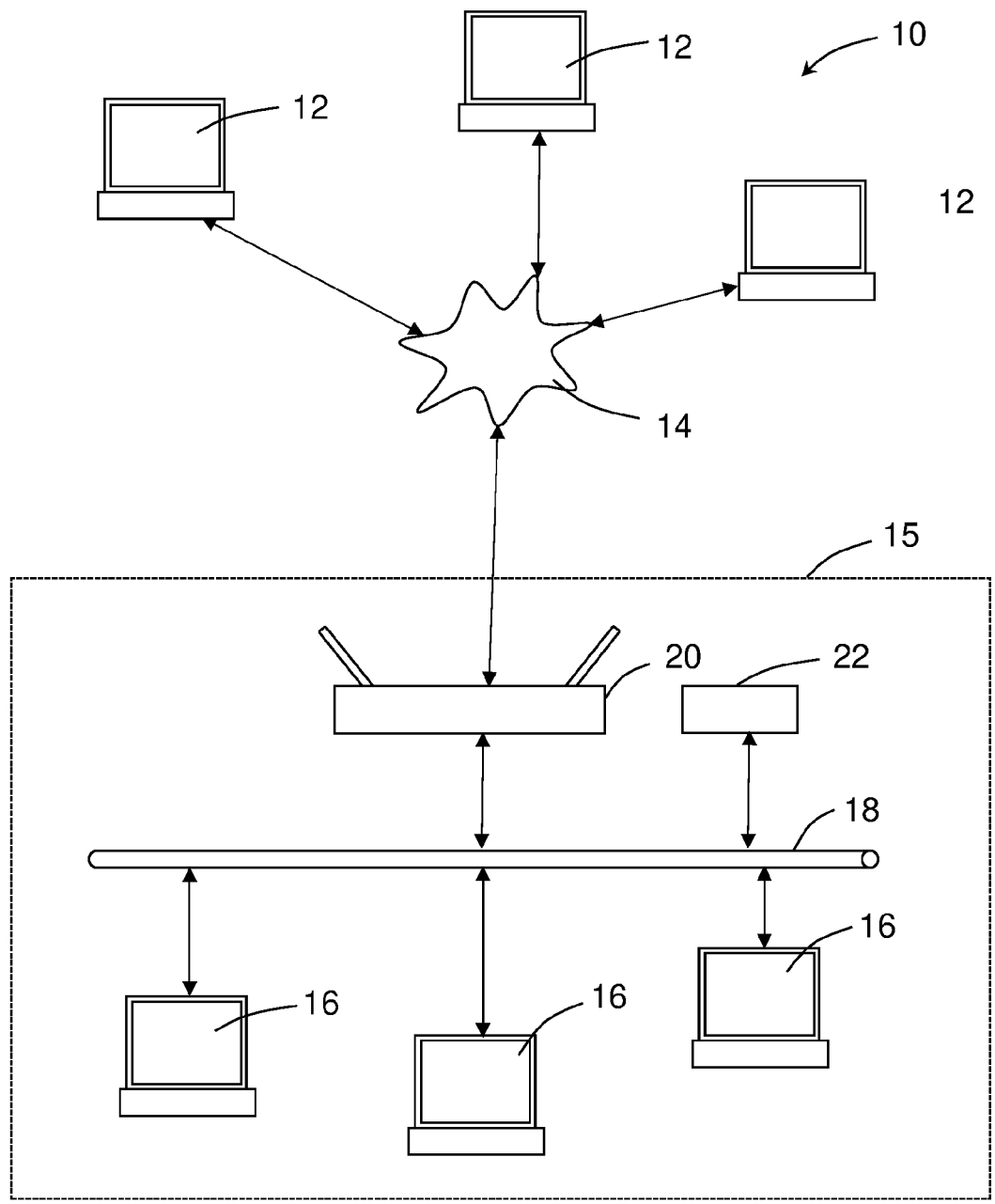
FIG. 1 is a block diagram of a typical network of computing devices to which the present anomaly detection system and method is applicable.

Referring to FIG. 1, a typical computer network arrangement 10 is shown, the network arrangement 10 including multiple remote computing devices 12 that may for example comprise personal computers, laptop computers, server computers, tablet computers, smartphones, and so on. Each of the remote computing devices 12 is able to connect to a wide area network such as the Internet 14, and through the Internet 14 to a large number of other computing devices.

The network arrangement 10 also includes a local network arrangement 15 that includes a system for detecting an anomalous event according to an embodiment of the present invention. The local network arrangement in this example includes several local computing devices 16 that may for example comprise personal computers, laptop computers, server computers, tablet computers, and smartphones; and a local area network 18 and associated network router 20 that facilitate network communications between individual local computing devices 16, and between a local computing device 16 and remote computing devices 12 through the Internet 14, for example using Ethernet and WiFi (802.11xx) protocols.

In the present example, the system for detecting an anomalous event is implemented on the router 20 since all network traffic between the individual local computing devices 16 and between the local computing devices 16 and the Internet 14 passes through the router 20. For example, the system may be implemented as a software application on the router 20 or using dedicated hardware on the router 20.

However, it will be understood that other arrangements are possible. For example, the system for detecting an anomalous event may be implemented on each individual computing device 12, 16, for example as a software application or using dedicated hardware; or using an anomaly detection device 22 connected to the local area network 18 that implements the anomaly detection system.

It is known that many natural processes have a degree of conformance to at least one power law, and the applicant has recognised that technical processes, such as many computer processes, also have a degree of conformance to at least one power law. The present system for and method of detecting an anomalous event make use of this realisation to detect an anomalous event, and identify the type of anomalous event detected.

Power law probability distributions are a class of probability distributions that follow the following general exponential decay profile:

$$y = n^{1/x}$$

where n is a constant.

Power law probability distributions tend to be found in functions that are descriptive of, or dependant on, a natural process. They also tend to be very sensitive to changes to the natural process such that the process distribution very rapidly distorts away from the expected ideal distribution as the natural process is distorted. Such distortion in the distribution is difficult to prevent as it relies on natural randomness, and humans and computers are generally poor at replicating this.

Accordingly, by using technical processes, such as computer processes, that have a degree of conformance to power laws, it is possible to detect when an unnatural change has been made to a process that is likely to be caused by an unnatural event, such as a malware infection, by detecting the variation from power law conformance.

In the examples described in the present specification, the power laws used include Benford's Law and Zipf's Law.

Benford's Law

Benford's Law states that for a set of decimal numbers generated by a natural process that conforms to Benford's Law, the probability of occurrence of each leading digit d (d∈1 ... 9) of the numbers is given as:

$$P(d) = \log_{10}(1 + 1/d)$$

where d is the leading digit and P is the probability of occurrence of the leading digit.

The respective probabilities for each number occurring as the leading digit in an ideal Benford distribution are therefore as follows:

| Number | 1 | 2 | 3 | 4 | 5 | 6 | 7 | 8 | 9 |
|---|---|---|---|---|---|---|---|---|---|
| Probability | 0.301 | 0.176 | 0.125 | 0.097 | 0.079 | 0.067 | 0.058 | 0.051 | 0.046 |

Figure 4:
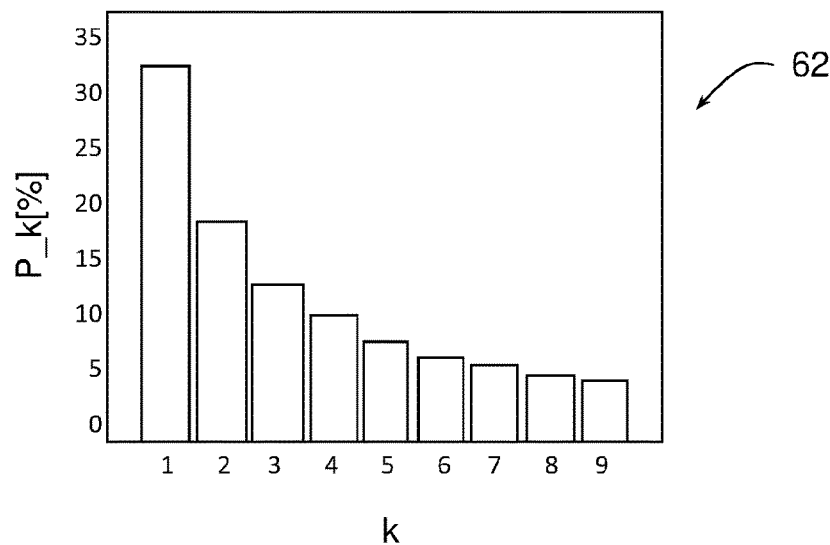
FIG. 4 is a bar chart illustrating a reference (ideal) profile according to Benford's Law.

An example ideal Benford profile 62 is shown in FIG. 4.

Importantly, Benford's Law does not change according to the collected data, the probability values above are the same for every Benford compliant data set, which means that it is possible to hard code the probabilities and use the expected profile to monitor for anomalous events. This leads to significant efficiency benefits because the anomaly detection system can be implemented using minimal processing resources, such as on a network router.

Many naturally occurring sets of numbers are known to have a degree of conformance to Benford's Law, including street addresses, stock prices, house prices, population numbers, lengths of rivers, and so on.

In the present examples described below, Benford's Law is applied to the inter-arrival times between network data packets and characters in computer logs, since the distributions of inter-arrival times and computer log characters have been recognised by the inventor to conform to Benford's Law.

Zipf's Law

Zipf's law states that if elements of a data set generated by a natural process are ranked by frequency, the probability of occurrence of an element of frequency rank r (sorted in descending order) is given by the following:

$$P(r) = 1/r^\beta * P(1)$$

where P(r) is the probability of occurrence of element of rank r in the sorted set of elements, P(1) is the probability of occurrence of the highest ranked element, and β is an exponent characterising the distribution.

For the present purposes, the exponent β used is 1 as this provides a suitable ideal Zipf profile.

For a set of elements that conform to a Zipf distribution with β=1, the second most common element will occur half as often as the first, the third most common frequency will occur ⅓ as often as the first, and the nth most common frequency will occur 1/n as often as the first.

Figure 5:
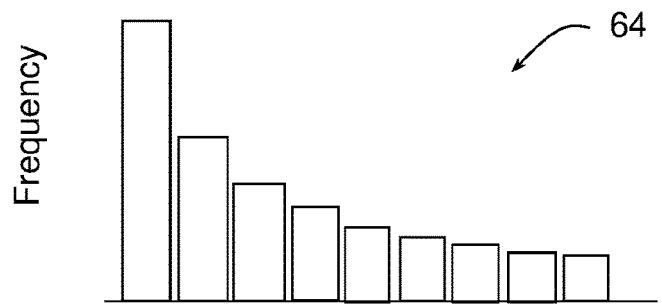
FIG. 5 is a bar chart illustrating a reference (ideal) profile according to Zipf's Law.

An example ideal Zipf profile 64 is shown in FIG. 5.

Many naturally occurring sets of data elements are known to have a degree of conformance to Zipf's Law, including the frequency of occurrence of words in natural language texts, irrespective of the language; notes in music; city populations (banded); corporation sizes (banded); incomes (banded); and so on.

In the present examples described below, Zipf's Law is applied to the inter-arrival times between network data packets and characters in computer logs, since the distributions of inter-arrival times and computer log characters has been recognised by the inventor to conform to Zipf's Law.

However, while the present invention applies Benford's Law and Zipf's law to network packet inter-arrival times and characters in computer logs, it will be understood that other power laws that can be applied to characteristics of a data set associated with a computer process are envisaged.

It will also be understood that data sets associated with source data other than network packet inter-arrival times and characters in computer logs may be used, the important aspect being that the data set has a degree of conformance to a natural power law.

Figure 2:
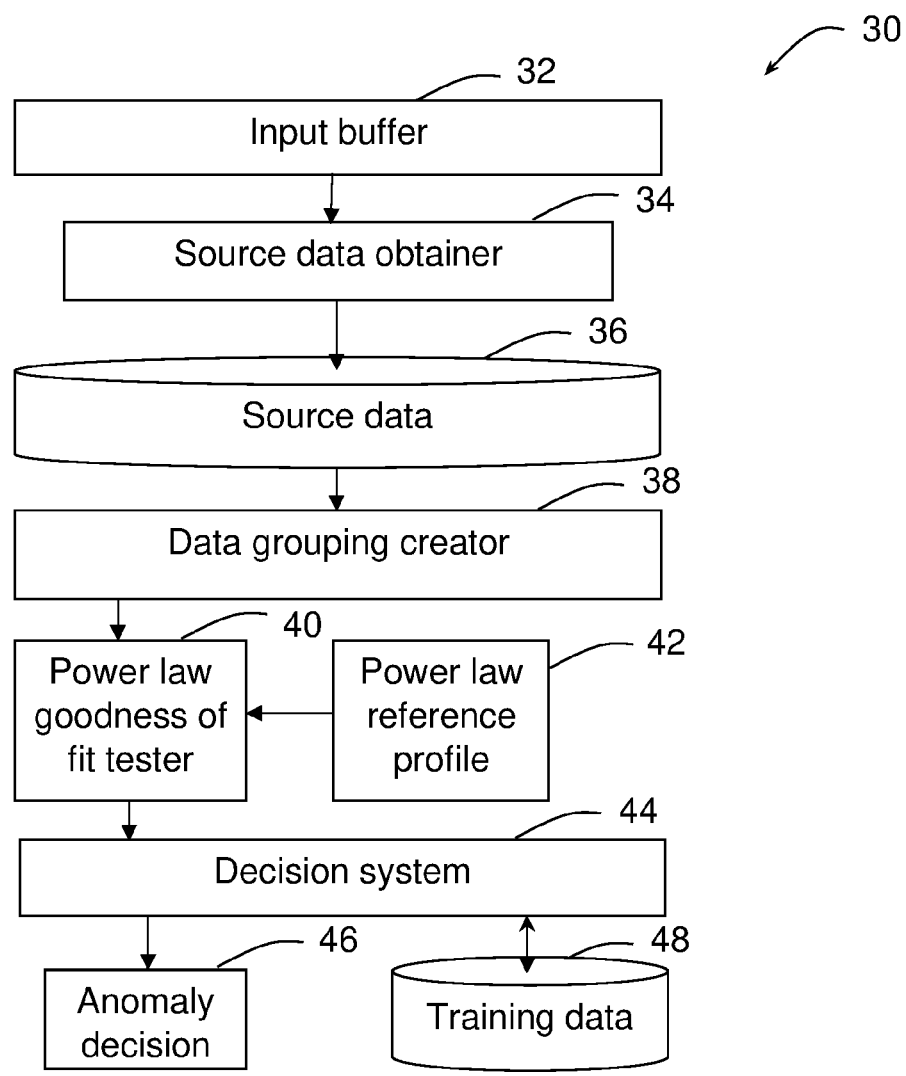
FIG. 2 is a block diagram of a system for detecting an anomalous event according to an embodiment of the present invention.

Referring to FIG. 2, an anomaly detection system 30 is shown. The system 30 in this example is for use with a computer network and is consequently incorporated into the network router 20, although it will be understood that the system 30 may be incorporated into other devices, such as into individual computing devices 12, 16 or an anomaly detection device 22, the important aspect being that the system 30 is able to access source data that has a degree of conformance to a natural power law.

In this example, the system 30 includes an input buffer 32 arranged to receive and store source data from packet processing and/or handling components of the router 20, although it will be understood that the system 30 may alternatively interact directly with a suitable packet processing and/or handling buffer of the router 20 in order to extract data as required by the system 30.

In this example, the system 30 also includes a source data obtainer 34 arranged to obtain power-law relevant source data from the input buffer 32 in batches referred to in this specification as 'groups' of data, and store each obtained data group in turn in a data storage device 36.

Figure 3:
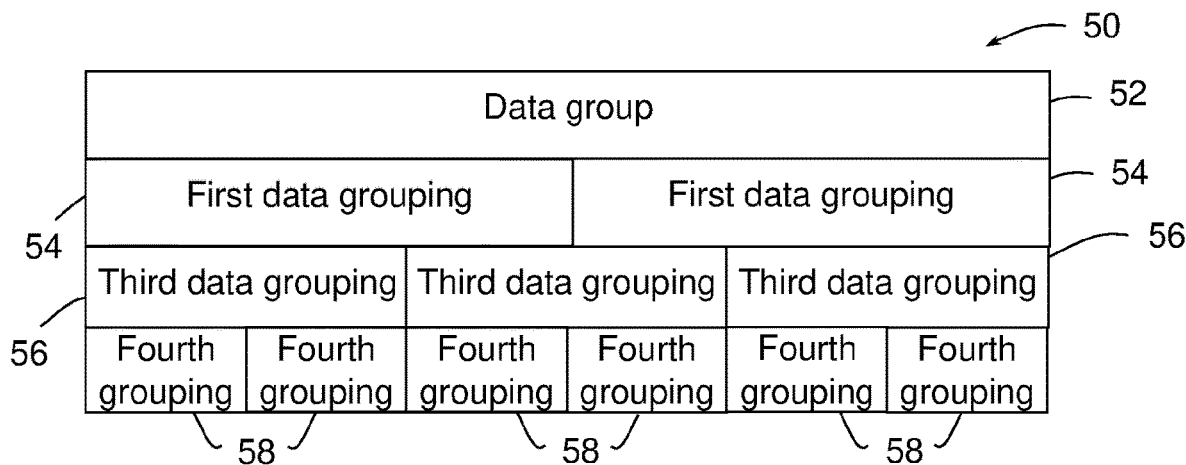
FIG. 3 is a diagrammatic representation of a data slicing structure used by the system shown in FIG. 2.

The system 30 also includes a data grouping creator 38 arranged to create multiple batches of source data from the data group, the batches of source data referred to in this specification as 'groupings' of source data. The data grouping creator 38 is arranged to split the data group into multiple data groupings of varying length, each data grouping including source data present in at least one other data grouping. In the present specification, a data grouping is also referred to as a data slice and these terms are used interchangeably For example, as shown in FIG. 3, the data grouping creator 38 may be arranged to create a first set of data slices from a data group 52 that includes 2 data slices 54 respectively corresponding to a first half and a second half of the data group 52, a second set of data slices that includes 3 data slices 56 respectively corresponding to consecutive thirds of the data group 52, and a third set of data slices that includes 6 data slices 58 respectively corresponding to consecutive sixths of the data group 52.

In this way, multiple data sets that are different from each other are produced from the source data in the data group 52, the multiple data sets enabling more context to be derived from the data group 52 than would be possible with the data group 52 alone.

The system 30 also includes a power law goodness of fit tester 40 arranged to compare the source data in the data group 52 and in each data grouping 54, 56, 58 with at least one relevant reference power law profile, for example an ideal natural power law reference profile 42, and to produce a goodness of fit value for the data group 52 and each data grouping 54, 56, 58 that is indicative of how closely the data group 52 or data grouping 54, 56, 58 conforms to the reference natural power law profile.

The goodness of fit tester 40 may use any suitable goodness of fit function to determine the degree of similarity between source data in the data group or a data grouping and a reference natural power law profile. In the present example, a Watson's goodness of fit test is used to produce a numerical value that increases with reducing similarity. The Watson's test is a Cramer von Mises statistical measure of goodness of fit.

In the examples described in the present specification, the power law goodness of fit tester 40 is arranged to compare the source data in the data group 52 and in each data grouping 54, 56, 58 with an ideal Benford's Law profile, for example as shown in FIG. 4, and an ideal Zipf's Law profile, for example as shown in FIG. 5.

The goodness of fit values derived from the data group 52 and the data groupings 54, 56, 58 are supplied to a decision system 44 that is arranged to automatically interpret the goodness of fit values and produce an anomaly decision 46 indicative of whether the goodness of fit values are representative of an anomalous event. The decision system 44 may also be arranged to indicate the type of anomalous event if an anomalous event has been detected.

The decision system 44 may be any be any arrangement capable of applying logic to the goodness of fit values to obtain an indication as to whether an anomalous event is likely to exist. For example, the decision system 44 may use simple thresholding such that a positive anomaly indication is produced when a defined number of the data group 52 and data groupings 54, 56, 58 have goodness of fit values that are above a defined threshold.

In addition, or alternatively, the decision system 44 may use decision trees, a random forest, or a machine learning system and/or neural network that is trained using training data 48 to recognise patterns in the goodness of fit values that are indicative of normal computer process data and computer process data that is indicative of an anomalous event, and to recognise specific patterns that are indicative of specific types of anomalous event. The training data may include multiple patterns of goodness of fit values that are indicative of normal computer process data and multiple patterns of goodness of fit values that are indicative of computer process data associated with an anomalous event.

It will be appreciated that the decision system 44 will indicate the presence of an anomaly for any sample of source data that produces goodness of fit values corresponding to a deviation of significance from a reference power law, and as such the system 30 is able to detect the presence of an anomaly even though the specific characteristics of the anomaly are not known. The specific classification of the anomaly by the system 30 may require prior knowledge of the anomaly, for example by appropriate training of the decision system.

Figure 6:
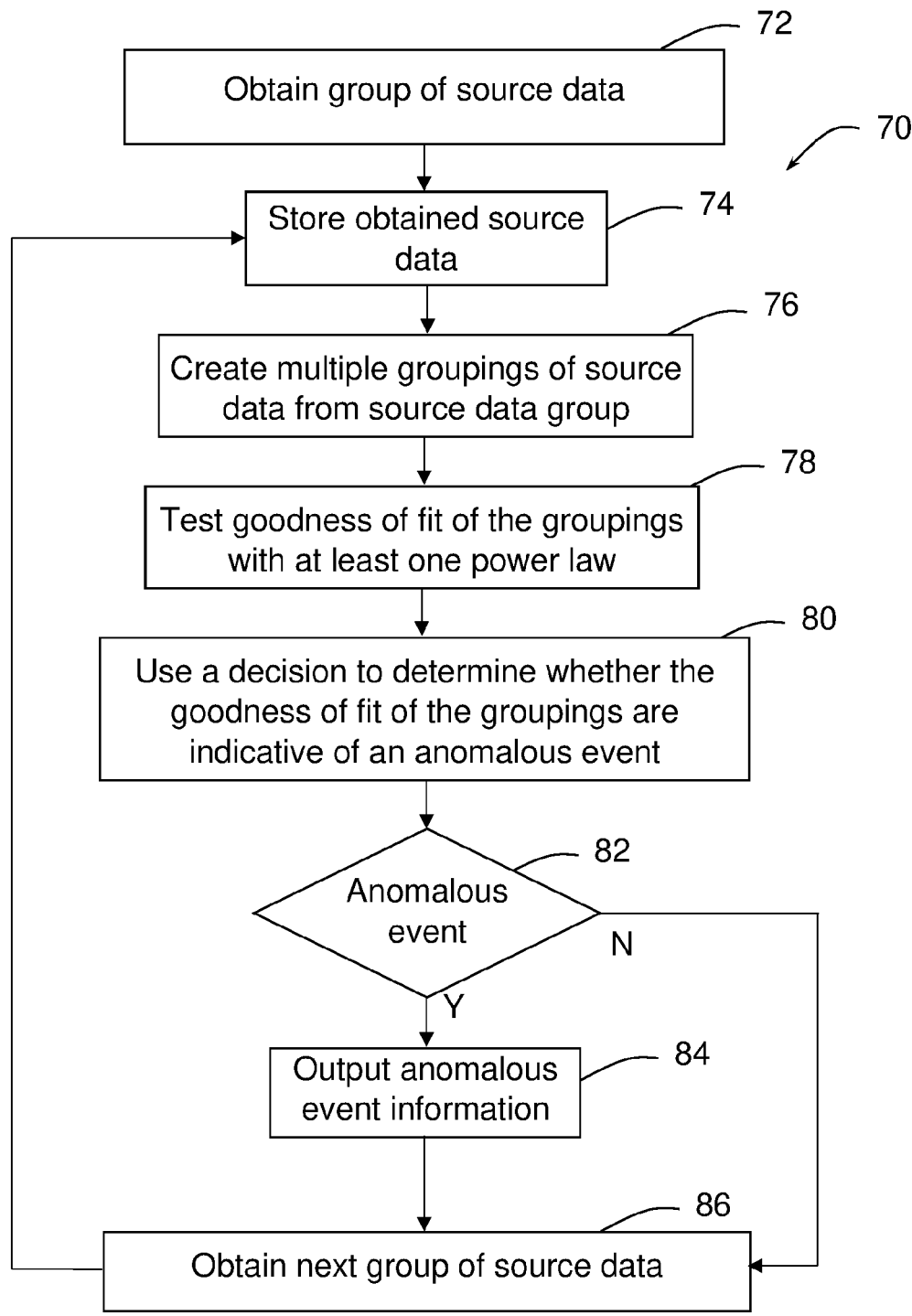
FIG. 6 is a flow diagram illustrating a method of detecting an anomalous event in accordance with an embodiment of the present invention.

Referring to FIG. 6, a flow diagram 70 illustrating steps 72 to 86 of a method of detecting an anomalous event, in this example in a computing system, is shown.

The method comprises obtaining a first group of source data of defined size from a relevant data source that is expected to conform to a natural power law, as indicated at step 72. As indicated at step 74, the obtained data group is temporarily stored, and multiple groupings of source data of multiple sizes are obtained from the data group, as indicated at step 76. Goodness of fit values are then produced for each slice of data (the data group 52 and each data grouping 54, 56, 58) and the goodness of fit values are supplied to the decision system 44, as indicated at steps 78 and 80. As indicated at step 84, the decision system then outputs anomalous event information indicative of whether an anomalous event exists and, if possible, the type of anomalous event based on the supplied goodness of fit values.

As indicated at step 86, the method then obtains the next group of source data of defined size from a relevant data source and repeats the process on the data in the next data group.

In the present example, the methodology involves using the decision system 44 to determine whether an anomalous event, such as a malware event, has occurred after each data group is processed. However, other arrangements are available. For example, the decision system 44 may be arranged to determine whether an anomalous event has occurred after several data groups have been processed, such as corresponding to a defined period of time. In this way, the decision system 44 will take into account progressions of goodness of fit values over time for the data group and data groupings.

Figure 7:
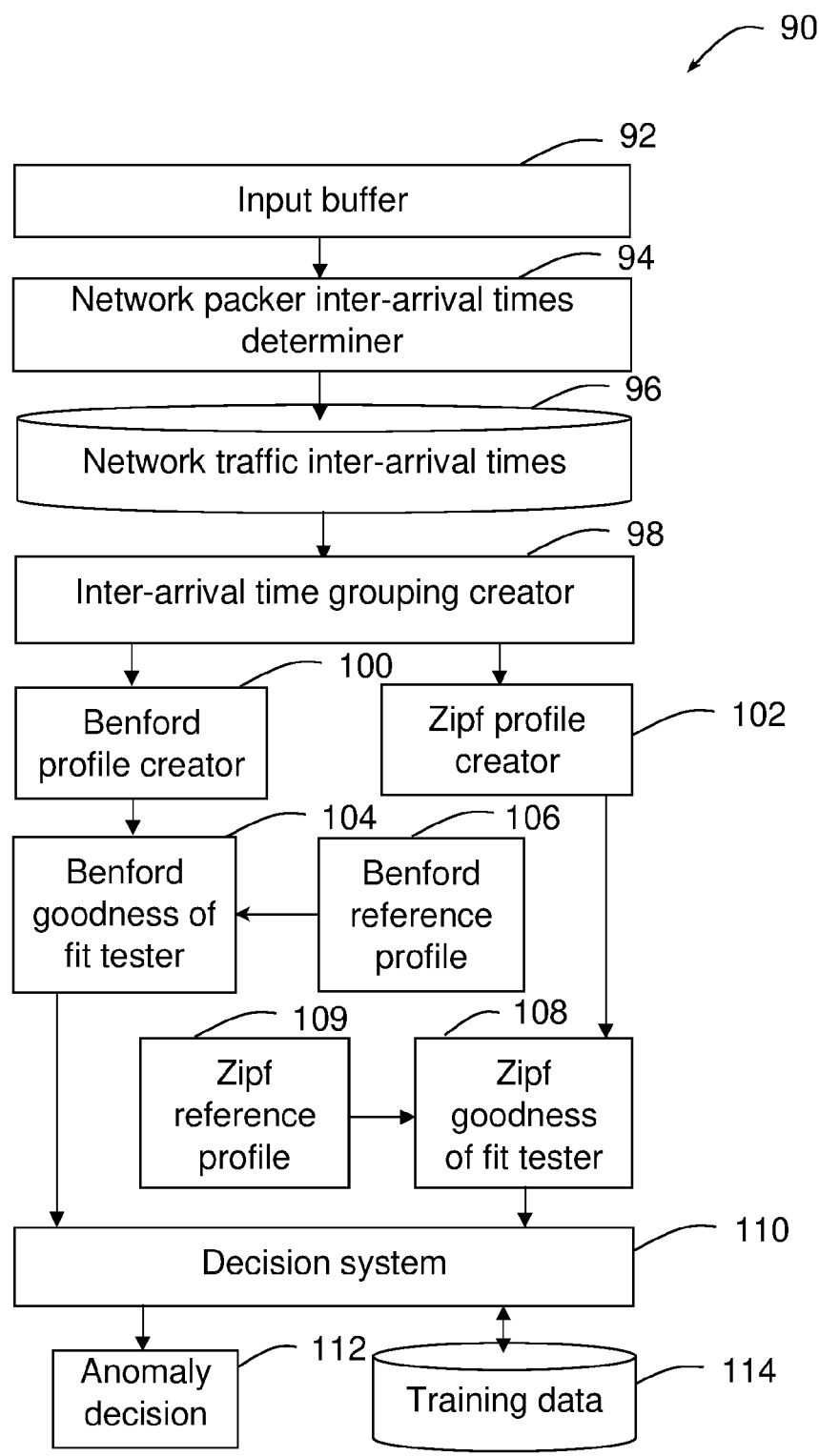
FIG. 7 is a block diagram of a system for detecting an anomalous event according to an embodiment of the present invention, the system using network packet inter-arrival times as power law-relevant data.
Figure 8:
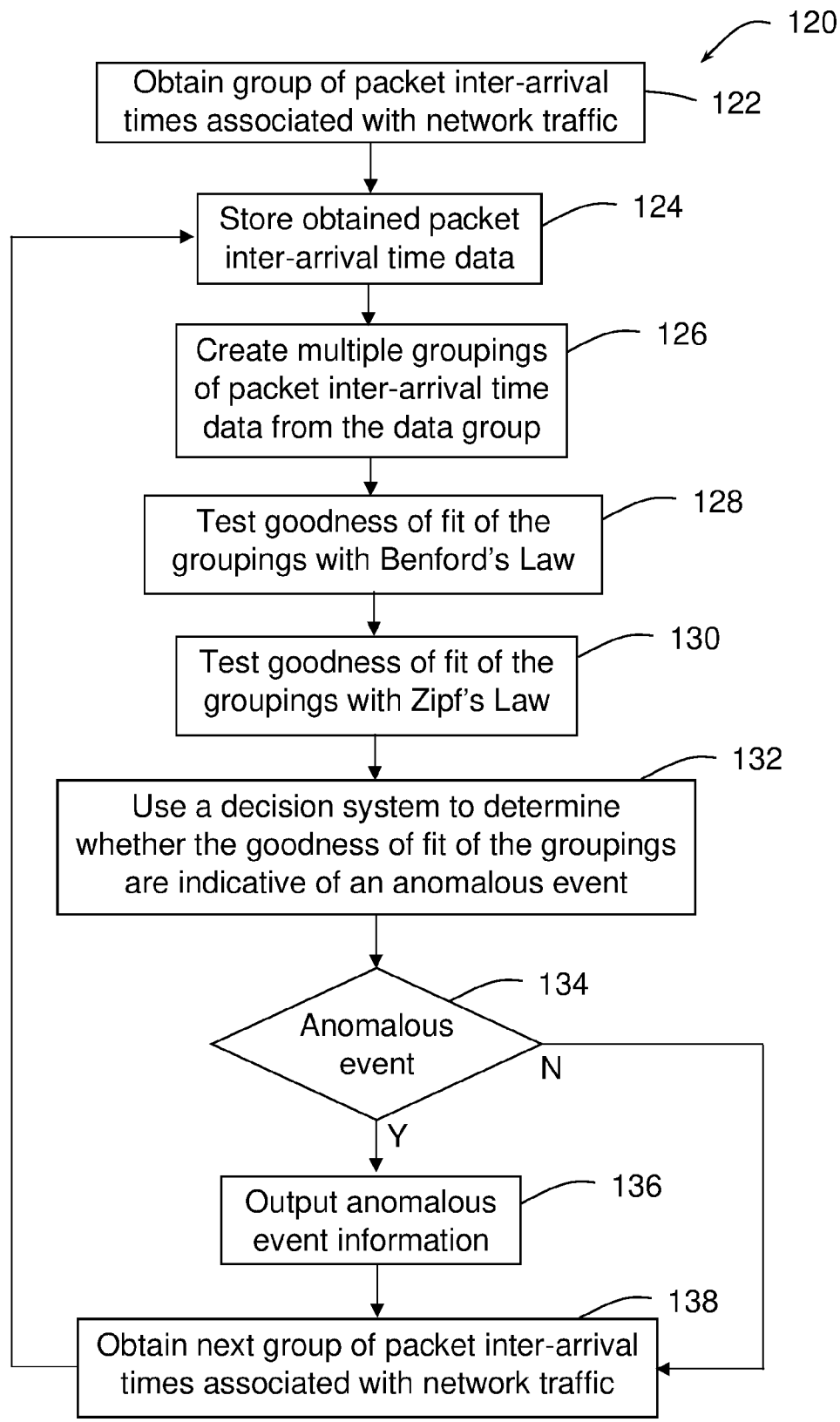
FIG. 8 is a flow diagram illustrating a method of detecting an anomalous event when the power law-relevant data includes network packet inter-arrival times.

A first specific example anomaly detection system 90 is shown in FIG. 7 and an associated method of detecting an anomalous event is illustrated in the flow diagram 120 in FIG. 8.

The system 90 uses computer process data, in this example network packet inter-arrival times, as the source data since normal network packet inter-arrival times in a computer network conform substantially to Benford's Law and Zipf's Law. Since network packet inter-arrival times conform to both Benford's and Zipf's Laws, the system 90 carries out goodness of fit tests by comparing to both ideal Benford's and Zipf's profiles. In this example, the network packets are TCP and/or UDP packets, although it will be understood that any suitable network packets may be used.

The anomaly detection system 90 is incorporated into the network router 20, and includes an input buffer 92 arranged to receive computer process data representative of a computer process from packet processing and/or handling components of the router 20, as indicated at step 122.

It will be understood that in this specification 'computer process data' includes any data from a data source that is indicative of and/or produced by a computer process.

The system 90 includes a network packet inter-arrival times determiner 94 arranged to determine inter-arrival times between network data packets in the input buffer and to store a group of packet inter-arrival times in a data storage device 96, as indicated at step 124. In this example, the data group comprises 10,000 packet inter-arrival times, although it will be understood that any appropriate number of packet inter-arrival times may be used.

An inter-arrival time grouping creator 98 creates multiple groupings of packet inter-arrival time data from the group of packet inter-arrival times, as indicated at step 126. In this example, 9 sets of data slices are produced from the group of packet inter-arrival times, as follows:

|  | Number of Slices in Level | Number of packet inter-arrival time values in each slice |
| --- | --- | --- |
| $1^{st}$ set of slices | 2 | 5,000 |
| $2^{nd}$ set of slices | 5 | 2,000 |
| $3^{rd}$ set of slices | 10 | 1,000 |
| $4^{th}$ set of slices | 20 | 500 |
| $5^{th}$ set of slices | 50 | 200 |
| $6^{th}$ set of slices | 100 | 100 |
| $7^{th}$ set of slices | 200 | 50 |
| $8^{th}$ set of slices | 500 | 20 |
| $9^{th}$ set of slices | 1000 | 10 |

In this example, the following profiles are created by the Benford profile creator 100 for each slice.
  i) a Benford profile based on the first digit of the packet inter-arrival times of the slice;
  ii) a Benford profile based on the second digit of the packet inter-arrival times of the slice; and
  iii) a Benford profile based on the third digit of the packet inter-arrival times of the slice.

As indicated at step 128, a Benford goodness of fit tester 104 produces a goodness of fit value for each created profile, the Benford goodness of fit tester 104 comparing each created profile to the reference Benford reference profile 106, in this example an ideal Benford profile 106.

A Zipf profile creator 102 creates a Zipf profile for each slice whereby packet inter-arrival times are sorted according to popularity such that the most common inter-arrival time is first, and as indicated at step 130 a Zipf goodness of fit tester 108 produces a goodness of fit value for each created profile, the Zipf goodness of fit tester 108 comparing each created profile to the reference Zipf reference profile 109, in this example an ideal Zipf profile 109.

In the present example, since packet inter-arrival times are essentially continuous but the reference Zipf profile maps popularity of discrete data elements to frequency of occurrence, a plurality of inter-arrival time bands are defined and each data element of a slice is mapped to one of the bands so that a similar profile to the ideal Zipf profile can be produced.

The Benford and Zipf goodness of fit testers 104, 108 therefore produce 4 goodness of fit values for each of the data group and data groupings, and since 1 data group and 1,887 data groupings (slices) are produced, 7,552 goodness of fit values are produced.

The 7,552 goodness of fit values are supplied to a decision system 110 that in this example comprises a machine learning algorithm trained by suitable training data 114 to recognise patterns in the input goodness of fit values as associated with a normal situation or an anomalous event, as indicated at steps 132 and 134. If the decision system 110 considers that an anomalous event, such as a malware event exists, an anomaly event information communication issues, for example by communicating an alert message to a relevant person or system, as indicated at step 136.

As indicated at step 138, the next group of packet inter-arrival times are then obtained and stored in the data storage device 96, and the process according to steps 124 to 134 is carried out on the new data group.

While the present example is described in relation to packet inter arrival times, it will be understood that other characteristics of network packets may be used, such as packet length, the important aspect being that the packet characteristic has a degree of conformance to a natural power law.

In the present example, the methodology involves using the decision system 110 to determine whether an anomalous event has occurred after each data group is processed. However, other arrangements are available. For example, the decision system 110 may be arranged to determine whether an anomalous event has occurred after several data groups have been processed, such as corresponding to a defined period of time. In this way, the decision system 110 will take into account progressions of the goodness of fit values over time for the data group and data groupings.

Figure 9:
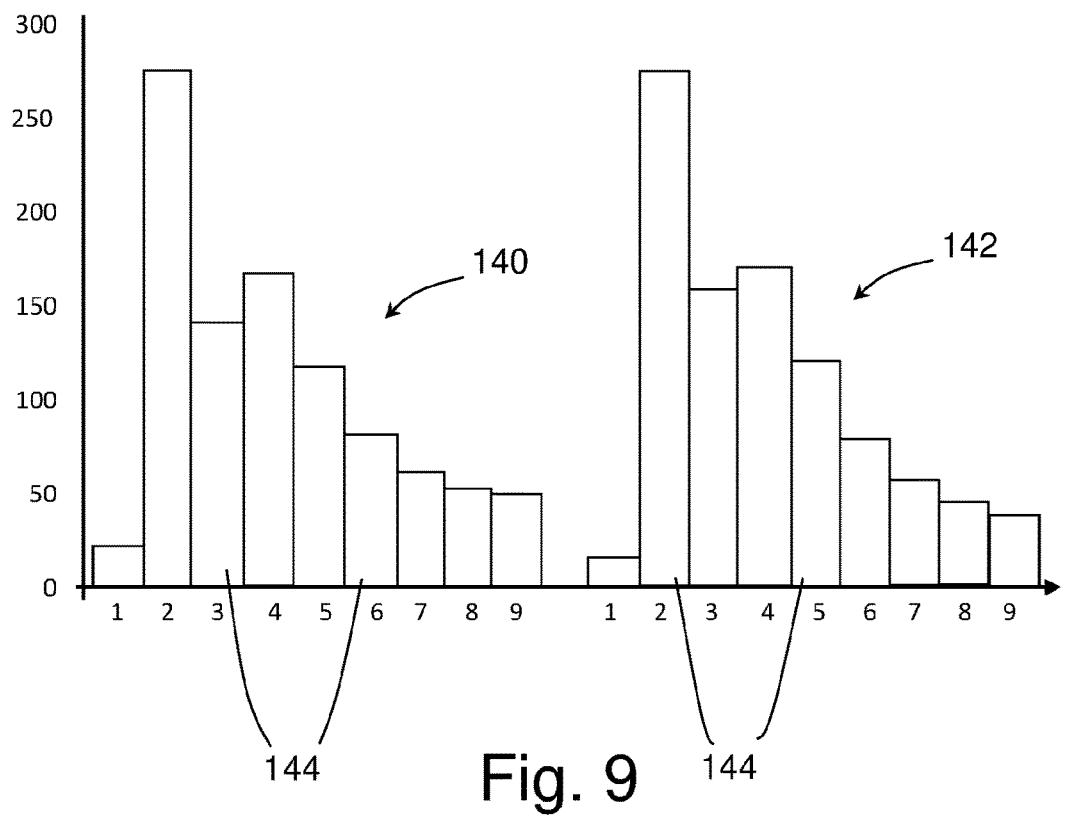
FIG. 9 shows example Benford's Law profiles for normal inter-packet arrival times and inter-packet arrival times during an anomalous event.

An example normal Benford profile 140 created from a single group of packet inter-arrival times and corresponding to a normal network of computers with no malware is shown in FIG. 9, and FIG. 9 also shows an example abnormal Benford profile 142 created from a single group of packet inter-arrival times and corresponding to a network of computers that has been infected with eldorado malware.

As shown in FIG. 9, the normal and abnormal Benford profiles 140, 142 are very similar and as a consequence it would be very difficult to use a single profile derived from all packet inter-arrival times in a data group to detect the presence of a malware infection.

However, according to the present embodiment, by producing a significant number of Benford profiles that are derived from respective multiple slices of data from each data group, it is possible to produce data representative of the behaviour of the computer network that is of much higher granularity than is possible with a single slice (a single data group). Importantly, it will be understood that data in each data grouping is also present in other data groupings, and in this way the data contributes to multiple Benford profiles, in both relatively small size slices and relatively large size slices.

Figure 10:
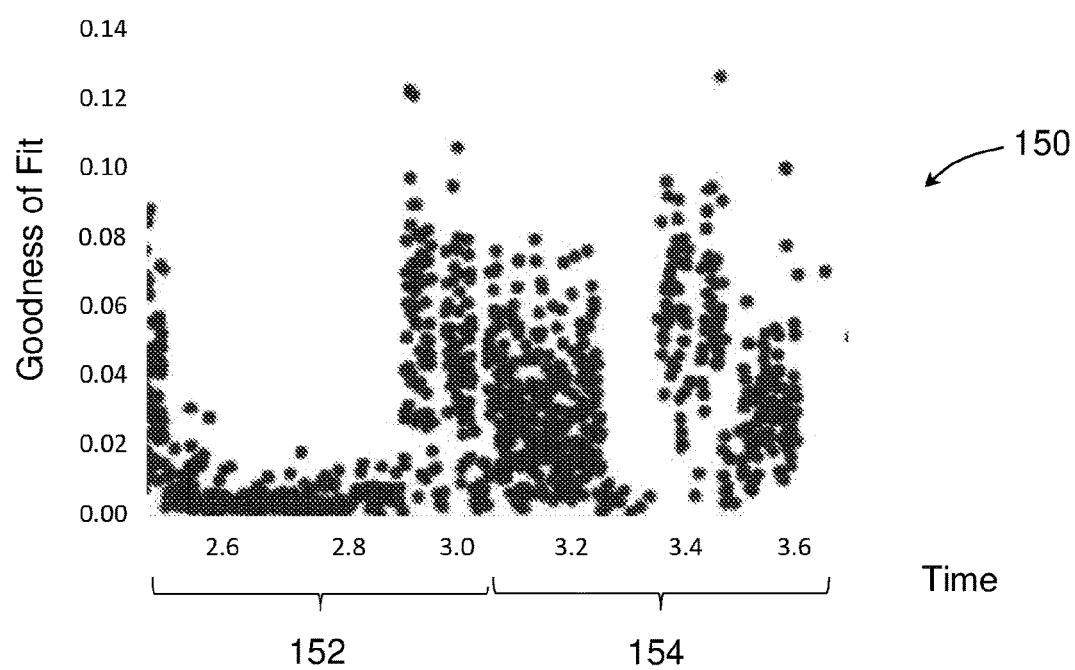
FIG. 10 is an example plot of goodness of fit values for a particular grouping of packet inter-arrival times over a time period that includes an anomalous event.

An example goodness of fit plot 150 representing goodness of fit values for a particular set of data slices, in this example the $3^{rd}$ set of data slices (that has 10 data groupings with 1,000 packet inter-arrival times in each data grouping), over a period of time is shown in FIG. 10. As shown, the goodness of fit values for the $3^{rd}$ set of data slices changes, to the extent that the plot 150 includes a normal portion 152 indicative of a normal network of computers with no malware and an abnormal portion 154 indicative of a network of computers that has been infected with malware.

Instead of using all goodness of fit values for a data group to train the decision system 110, the decision system 110 may be trained using such temporal goodness of fit data for each set of data slices, and the live temporal data used by the decision system 110 to make decisions in relation to the presence of an anomaly, such as malware, and the type of anomaly, such as the type of malware present.

Figure 11:
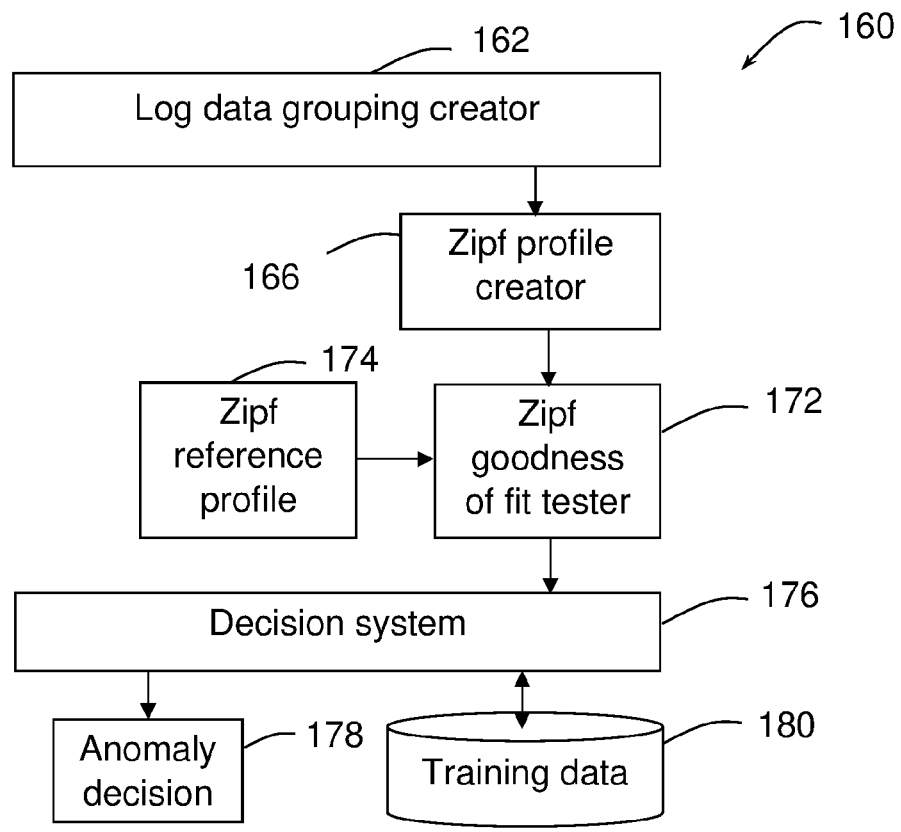
FIG. 11 is a block diagram of a system for detecting an anomalous event according to a further embodiment of the present invention, the system using computer log data as power law-relevant data.
Figure 12:
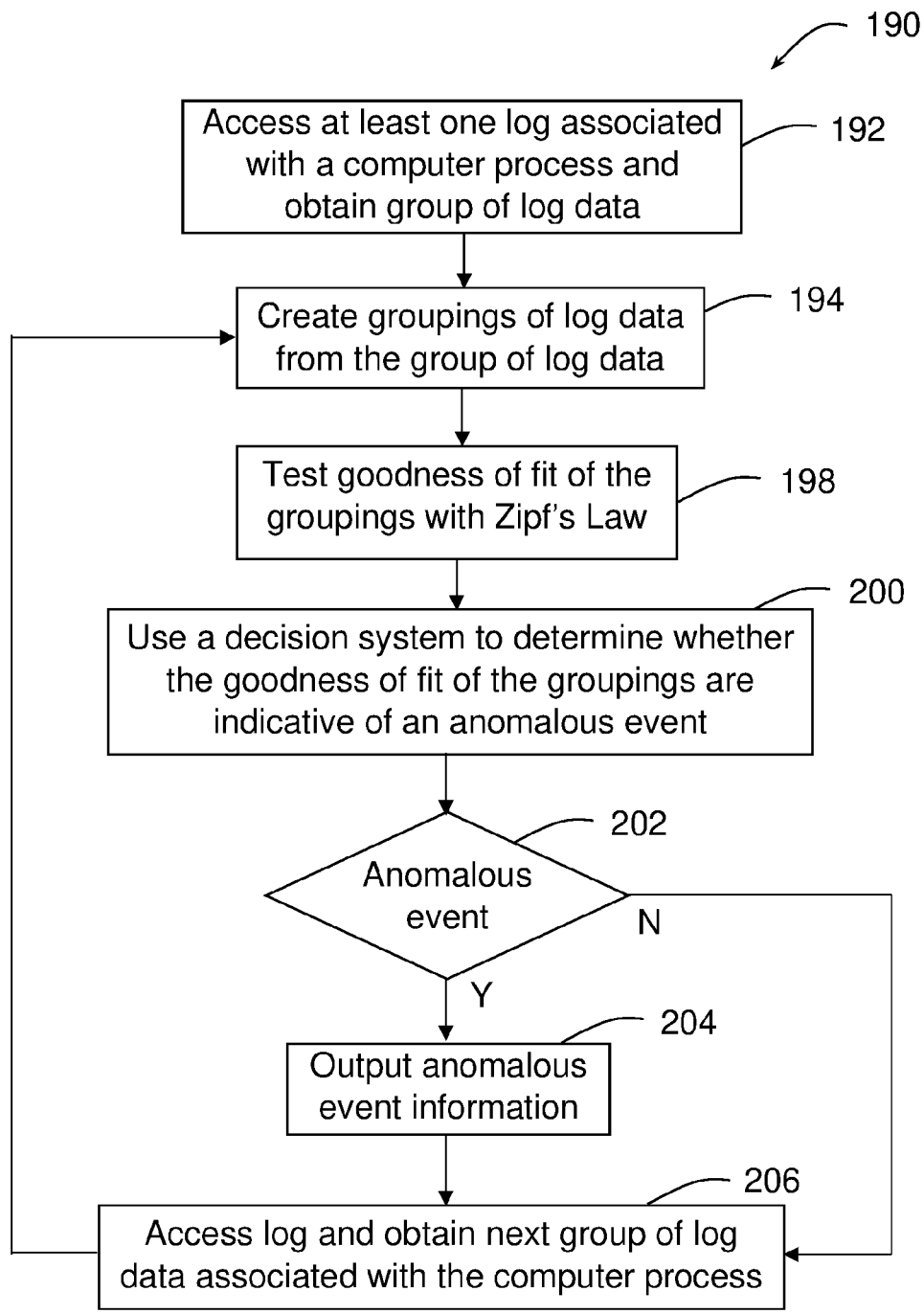
FIG. 12 is a flow diagram illustrating a method of detecting an anomalous event when the power law-relevant data includes computer log data.

A second specific example anomaly detection system 160 is shown in FIG. 11 and an associated method of detecting an anomalous event is illustrated in the flow diagram 190 in FIG. 12.

The system 160 uses computer process data contained in computer logs as the source data since particular computer logs associated with a computer network conform substantially to Zipf's Law and the content of the computer logs change when a malware infection exists. Since the selected one or more computer logs conform to Zipf's Law, the system 160 carries out goodness of fit tests by comparing to an ideal Zipf's profile.

The anomaly detection system 160 is incorporated into the network router 20 and arranged such that the system 160 is able to access computer logs created by the router. In this example, the computer log is an HTTP access log, although it will be understood that other computer logs are envisaged such as an auth log. An example HTTP access log may include the following type of information:

134.7.237.138-[03/Apr/2020:19:19:35 +0800] "GET/ HTTP/1.1" 401 179 "-" "Mozilla/5.0 (Windows NT 10.0; Win64; x64; rv:74.0) Gecko/20100101 Firefox/ 74.0"

134.7.237.13-group23 [03/Apr/2020:19:19:36 +0800] "GET/HTTP/1.1" 401 581 "-" "Mozilla/5.0 (Windows NT 10.0; Win64; x64) AppleWebKit/537.36 (KHTML, like Gecko) Chrome/70.0.3538.102 Safari/537.36 Edge/18.18363"

134.7.237.13-group23 [03/Apr/2020:19:19:50 +0800] "GET/HTTP/1.1" 200 801 "-" "Mozilla/5.0 (Windows NT 10.0; Win64; x64) AppleWebKit/537.36 (KHTML, like Gecko) Chrome/70.0.3538.102 Safari/537.36 Edge/18.18363"

134.7.237.13-[03/Apr/2020:19:19:51 +0800] "GET/favicon.ico HTTP/1.1" 401 581 "-" "Mozilla/5.0 (Windows NT 10.0; Win64; x64) AppleWebKit/537.36 (KHTML, like Gecko) Chrome/70.0.3538.102 Safari/ 537.36 Edge/18.18363"

134.7.237.138-group23 [03/Apr/2020:19:20:08 +0800] "GET/HTTP/1.1" 200 801 "-" "Mozilla/5.0 (Windows NT 10.0; Win64; x64; rv:74.0) Gecko/20100101 Firefox/74.0"

134.7.237.138-group23 [03/Apr/2020:19:20:08 +0800] "GET/favicon.ico HTTP/1.1" 404 153 "-" "Mozilla/5.0 (Windows NT 10.0; Win64; x64; rv:74.0) Gecko/ 20100101 Firefox/74.0"

The system includes a log data grouping creator 162 arranged to read the computer log in order to access a group of log characters, and create multiple groupings (slices) of log characters from a group of log characters, as indicated at steps 192 and 194. In this example, the character group comprises 10,000 characters, although it will be understood that any appropriate number of characters may be used for a character group.

In this example, 9 sets of data slices are produced from the group of packet inter-arrival times, as follows:

|  | Number of Slices in Level | Number of log characters in each slice |
| --- | --- | --- |
| $1^{st}$ set of slices | 2 | 5,000 |
| $2^{nd}$ set of slices | 5 | 2,000 |
| $3^{rd}$ set of slices | 10 | 1,000 |
| $4^{th}$ set of slices | 20 | 500 |
| $5^{th}$ set of slices | 50 | 200 |
| $6^{th}$ set of slices | 100 | 100 |
| $7^{th}$ set of slices | 200 | 50 |
| $8^{th}$ set of slices | 500 | 20 |
| $9^{th}$ set of slices | 1000 | 10 |

A Zipf profile creator 166 creates a Zipf profile for each slice whereby characters are sorted according to popularity such that the most common character in the slice is first, and a Zipf goodness of fit tester 172 produces a goodness of fit value for each created profile, the Zipf goodness of fit tester 172 comparing each created profile to the ideal Zipf reference profile 174, as indicated at step 198.

The Zipf goodness of fit tester 172 therefore produces 1 goodness of fit value for each of the data group and data groupings, and since 1 data group and 1,887 data groupings (slices) are produced, 1,888 goodness of fit values are produced.

The 1,888 goodness of fit values are supplied to a decision system 176 that in this example comprises a machine learning algorithm trained by suitable training data 180 to recognise patterns in the input goodness of fit values as associated with a normal situation or an anomalous event, as indicated at steps 200 and 202. If the decision system 176 considers that an anomalous event, such as a malware event exists, an anomalous event information communication issues, for example by communicating an alert message to a relevant person or system, as indicated at step 204.

As indicated at step 206, the next group of log characters are then accessed, and the process according to steps 194 to 206 is carried out on the new data group.

While the present example is described in relation to an anomaly detection system 160 that uses one computer log, it will be appreciated that other arrangements are possible. For example, the system 160 may use multiple similar or different computer logs from one or multiple computing devices in the relevant computer network, the system 160 for example combining the characters in both logs into a tag of words' so that a data source is used that is not specific to the context of one computer log, but instead the data source is representative of both logs and thereby reduces individual context. This may be achieved for example by selecting a portion of each of the multiple logs for the data group and each data grouping (slice), or in any other suitable way.

In the present example, the methodology involves using the decision system 176 to determine whether an anomalous event has occurred after each data group is processed. However, other arrangements are available. For example, the decision system 176 may be arranged to determine whether an anomalous event has occurred after several data groups have been processed, such as corresponding to a defined period of time. In this way, the decision system 176 will take into account progressions of the goodness of fit values over time for the data group and data groupings.

The above embodiments use technical processes that have a degree of conformance to power laws to detect when an unnatural change has been made to a process by detecting a variation from the power law.

In a circumstance wherein data derived from a system conforms substantially to a power law distribution, it can be assumed that the system follows a normal distribution, typically a Weibull distribution. Such power law analytics are considered to be derivative statistics since the relevant data associated with the system is descriptive of a statistical feature.

While such derivative statistics are good at detecting changes beyond normal behaviour in the underlying system, for limited samples of source data it is difficult to detect subtle changes of behaviour and identify the nature of the behaviour.

In the above embodiments, arrangements are defined whereby one goodness of fit value is produced for a data group and for each data grouping derived from the data group, and the produced pattern of goodness of fit values is used to determine whether an anomalous event exists using a decision system.

An embodiment will now be described that recognises that if data associated with a system conforms to a normal distribution, the variance of error between a power law distribution obtained from the system and the ideal power law distribution, and the mean of the error, are both dependent on the original distribution. In view of this, it is possible to characterise behaviour in a system as a normal distribution of errors from an ideal power law distribution. Such a secondary normal distribution of error is effectively a derivative of a derivative and can be used to identify an anomalous change to a system by comparing a power law error distribution generated from a data group derived from a system with a power law error distribution generated from a previous data group.

The present embodiment may be implemented using an arrangement similar to the arrangement shown in FIG. 1, for example on a router 20 as a software application or using dedicated hardware, on each individual computing device 12, 16, for example as a software application or using dedicated hardware, or on an anomaly detection device 22 connected to a local area network 18.

Figure 13:
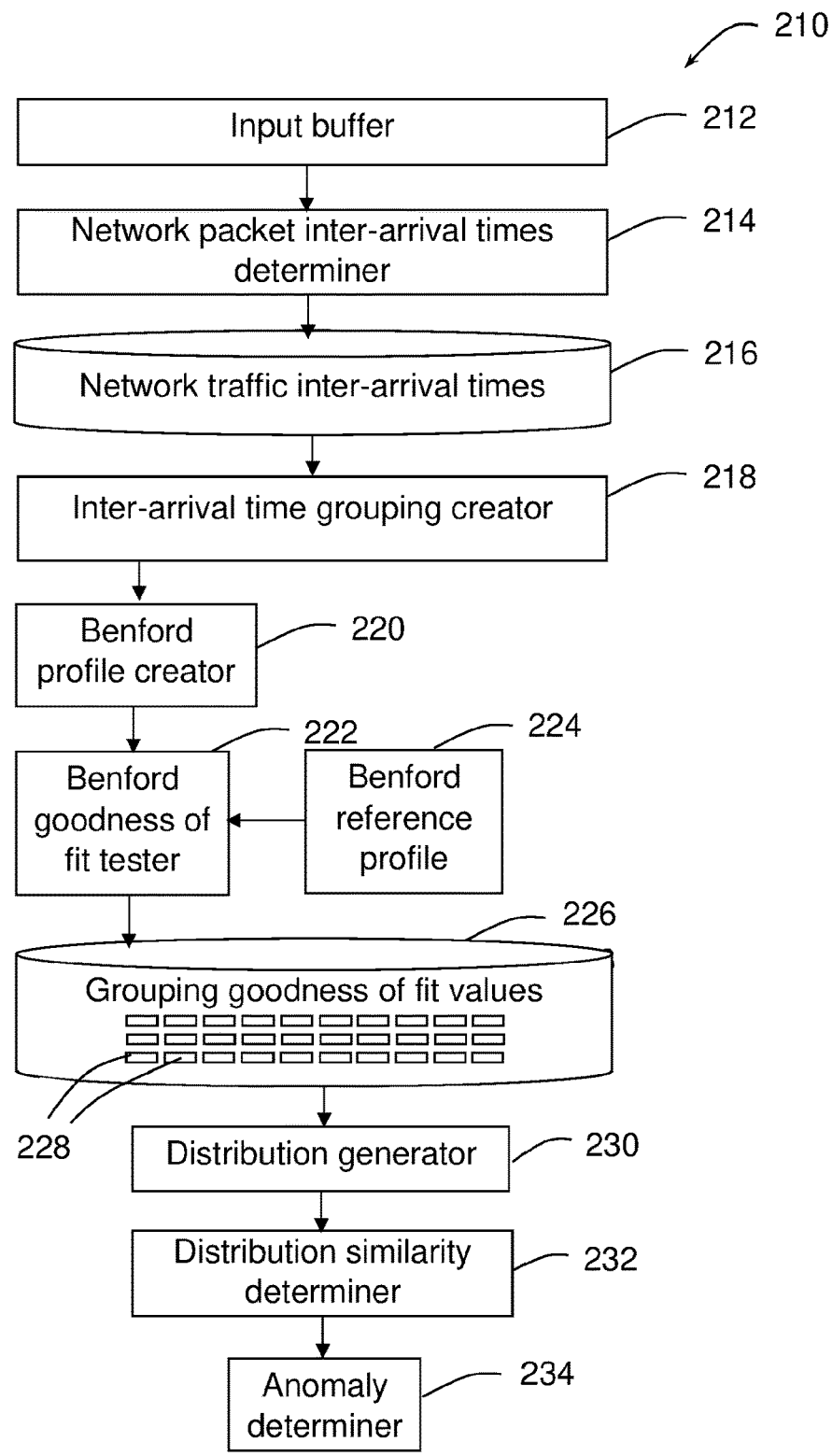
FIG. 13 is a block diagram of a system for detecting an anomalous event according to an alternative embodiment of the present invention.
Figure 14:
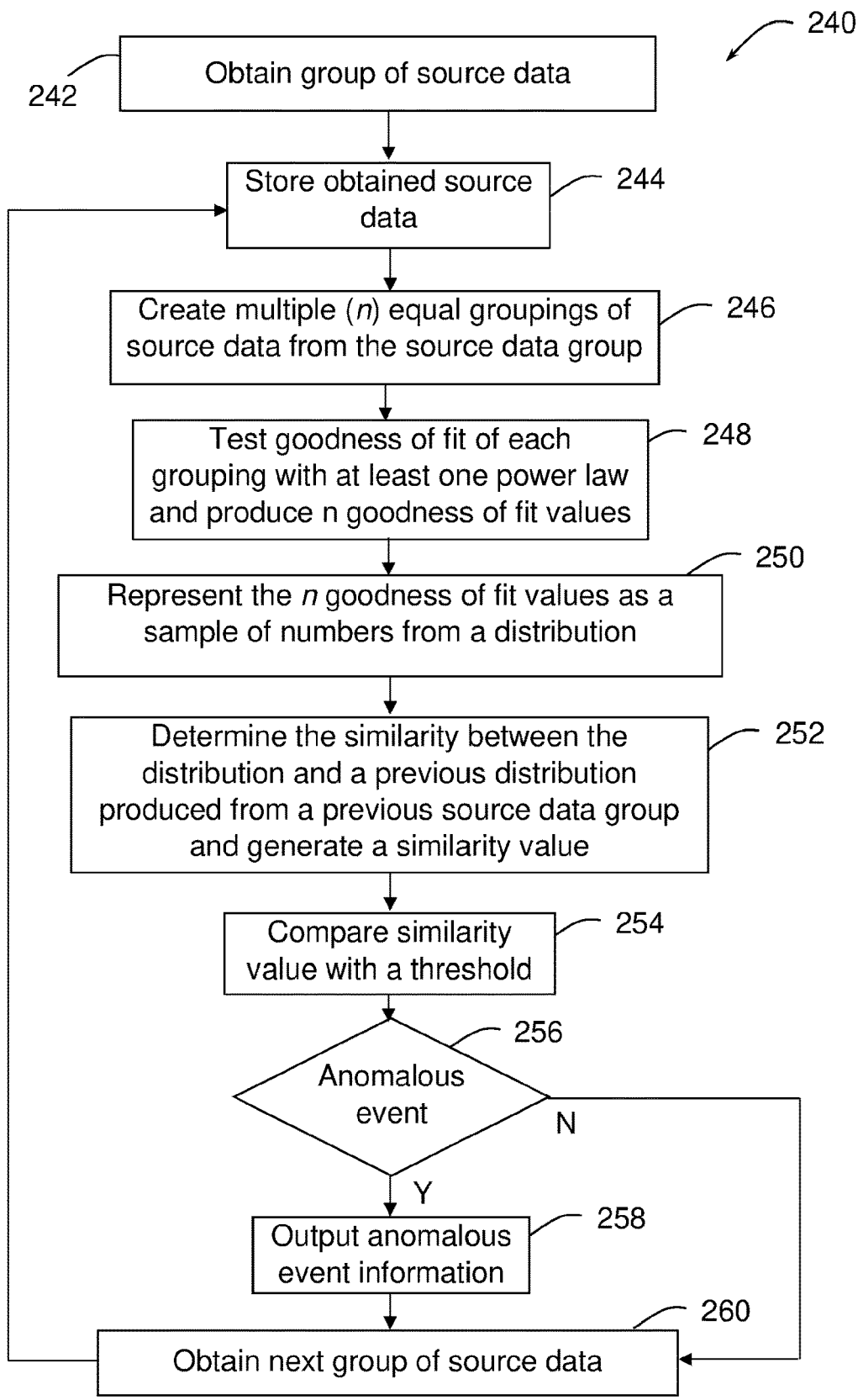
FIG. 14 is a flow diagram illustrating a method of detecting an anomalous event in accordance with an alternative embodiment of the present invention.

An example anomaly detection system 210 according to the present alternative embodiment is shown in FIG. 13 and an associated method of detecting an anomalous event is illustrated in the flow diagram 240 in FIG. 14.

The system 210 uses data from a data source associated with a system where the data is expected to substantially conform to a power law in the absence of an anomaly. In this example, the data is computer process data, in this example network packet inter-arrival times, since normal network packet inter-arrival times in a computer network conform substantially to Benford's Law and Zipf's Law. In this example, the network packets are TCP and/or UDP packets, although it will be understood that any suitable network packets may be used.

In an example implementation, the anomaly detection system 210 is incorporated into the network router 20, and includes an input buffer 212 arranged to receive computer process data from packet processing and/or handling components of the router 20, as indicated at step 242.

The system 210 includes a network packet inter-arrival times determiner 214 arranged to determine inter-arrival times between network data packets in the input buffer and to store a group of packet inter-arrival times in a data storage device 216, as indicated at step 244. In this example, the data group comprises 10,000 packet inter-arrival times, although it will be understood that any appropriate number of packet inter-arrival times may be used.

An inter-arrival time grouping creator 218 creates multiple groupings 228 of packet inter-arrival time data from the group of packet inter-arrival times, as indicated at step 246. In this example, 10 data groupings 228 are produced from the data group. The data groupings may be of equal size, although other arrangements are envisaged.

For each data grouping, a power law profile is created from the data in the grouping by a power law creator 220. In this example, a Benford profile based on the first digit of the packet inter-arrival times of the grouping is used. However, it will be understood that other characteristics may be used, including a Benford profile based on the second digit of the packet inter-arrival times, or a Benford profile based on the third digit of the packet inter-arrival times; or other power laws may be used to produce the power law profiles, such as Zipf's Law.

As indicated at step 248, a goodness of fit tester 222 then produces a goodness of fit value for each created profile, the goodness of fit tester 222 comparing each created profile to a reference power law profile 224. In this example, the goodness of fit tester 222 is arranged to compare each created Benford profile with an ideal Benford profile 224.

The goodness of fit tester 222 may use any suitable goodness of fit function to determine the degree of similarity between obtained source data and a reference natural power law profile. In the present example, a Watson's goodness of fit test is used that produces a numerical value that increases with reducing similarity.

Therefore, in this example, for each data group, 10 goodness of fit values 228 indicative of an error from an ideal power law distribution are produced. The set of goodness of fit values 228 produced for each data group are stored in a data storage device 226.

Using a distribution generator 230, a statistical distribution is generated for each data group using the goodness of fit values produced from the 10 data groupings derived from the data group, as indicated at step 250. In this example, the statistical distribution is a probability distribution.

In the present example, since goodness of fit values are essentially continuous, a plurality of goodness of fit value bands are defined and each goodness of fit value is mapped to one of the bands so that a probability distribution can be produced. The goodness of fit values can be considered to represent error values indicative of a degree of error between determined power law profiles and the ideal power law profile.

Using a distribution similarity determiner 232, a similarity value indicative of a similarity between a generated statistical distribution and a previous generated statistical distribution is produced, as indicated at step 252, and the similarity value compared with a threshold by an anomaly determiner 234, as indicated at step 254. If the threshold is exceeded, an anomalous event is determined to exist, as indicated at steps 256 and 258.

In this example, the distribution similarity determiner 232 is arranged to carry out a Kolmogorov-Smirnov (K-S) test that determines the likelihood that values in a first distribution are consistent with values in a second distribution. However, it will be understood that other similarity tests may be used.

In this example, a current generated statistical distribution is compared with the most recent previously generated statistical distribution so that an indication of a change of significance can be identified substantially in real time. For example, if it is assumed that the last generated statistical distribution of values represents a 'normal' situation, that is, a situation wherein an anomalous event does not exist, then a comparison of the 'normal' distribution with a successive statistical distributions will provide an indication as to whether a change to the behaviour of the underlying system has occurred that corresponds to an anomalous event.

While the present example is described in relation to packet inter arrival times, it will be understood that other characteristics of network packets may be used, such as packet length, the important aspect being that the packet characteristic has a degree of conformance to a natural power law. Similarly, data elements other than derived from network packets may be used depending on the underlying system, the important aspect being that the data elements are indicative of behaviour of the system and are considered to substantially conform to a power law.

Figure 15:
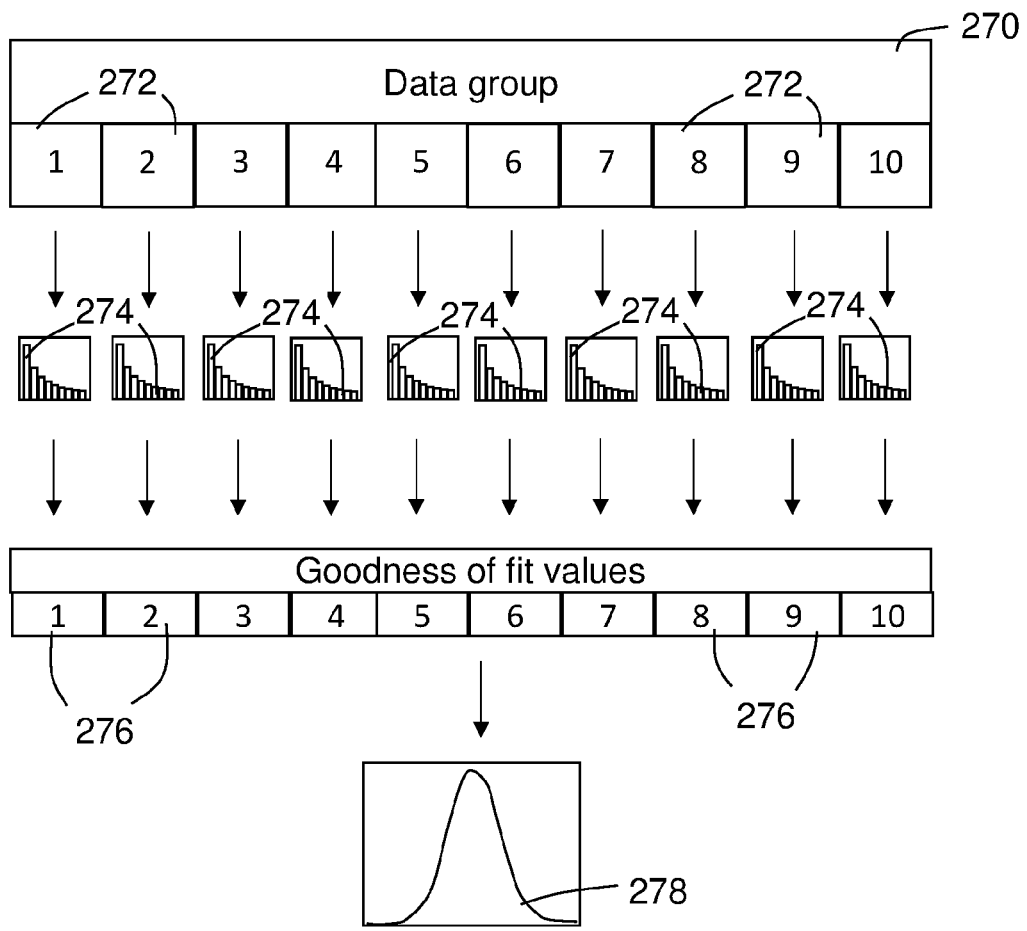
FIGS. 15 and 16 are conceptual representations of the method illustrated in FIG. 14.
Figure 16:
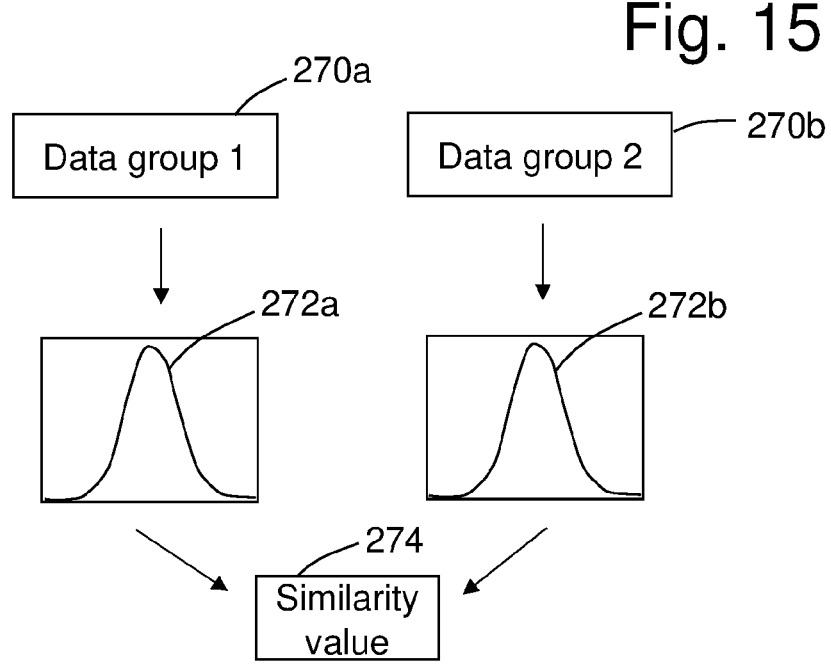

A conceptual representation of an example of the present embodiment is shown in FIGS. 15 and 16.

As shown in FIG. 15, a data group 270 of data elements from a data source associated with a system and representative of behaviour of the system is first obtained, and from the data group 10 data groupings 272 of data elements are obtained, in this example by slicing the data group into equal successive data groupings. A Benford profile 274 is produced from each data grouping 272, in this example using the first digit of each data element, and each Benford profile is compared to an ideal Benford profile using a Watson's goodness of fit test to produce a goodness of fit value 276. The 10 goodness of fit values are then represented as a probability distribution 278 that represents the distributions of error from an ideal Benford profile over the set of data elements in the data group.

As shown in FIG. 16, each data group 270a, 270b of the source data produces a respective probability distribution 272a, 272b, and in this example in order that a change in behaviour in the system that is anomalous can be identified substantially in real time, each created probability distribution 272 is compared with an immediately previous probability distribution 272 to produce a similarity value 274 that is compared to a threshold.

It will be understood that in a system that is considered to conform to a natural power law, it can be assumed that power law error values derived from data elements obtained from the system will conform to a type of normal distribution, and therefore a significant deviation of the error values from the normal distribution will indicate a change in behaviour that is unlikely to be natural and therefore likely to be anomalous.

Figure 17:
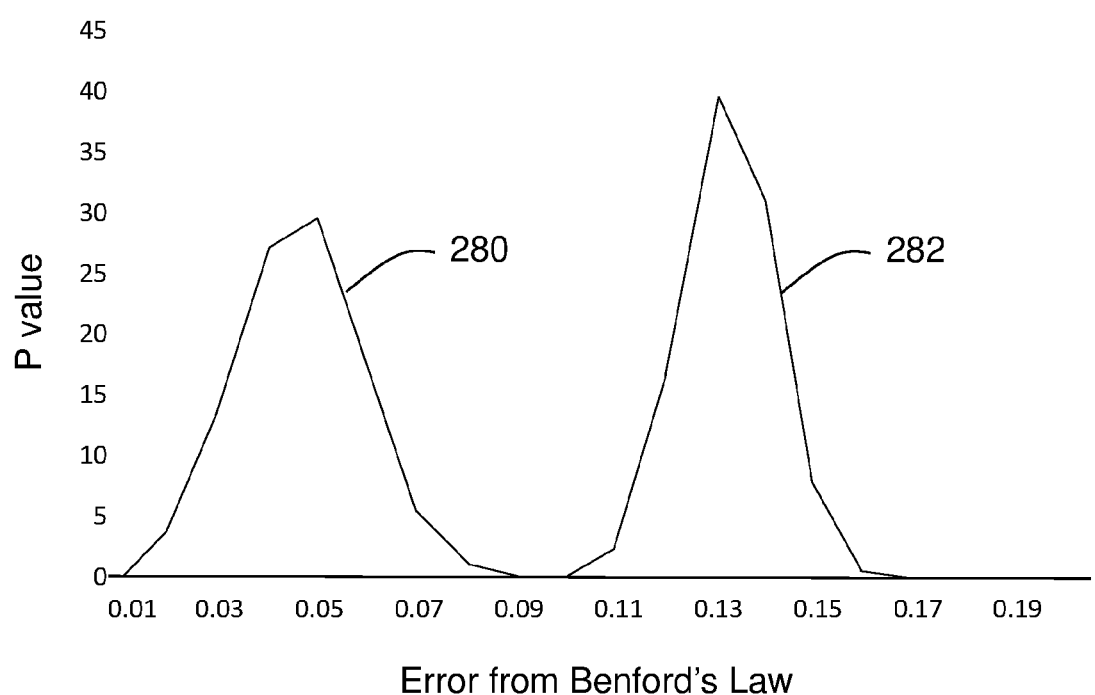
FIG. 17 is a plot illustrating example probability distributions derived from an anomalous event and a non-anomalous event.

FIG. 17 shows example probability distributions of error values for an example 2 successive data groups of packet inter-arrival time data elements associated with a system. Since the error (goodness of fit) values are essentially continuous, a plurality of error value bands were defined and each error value derived from a data grouping is mapped to one of the bands.

FIG. 17 shows a normal probability distribution of error values 280 derived from a data group associated with a normal situation, that is, where an anomalous event does not exist; and an anomalous probability distribution of error values 282. As shown, the normal and anomalous probability distributions 280, 282 differ significantly in both shape and position, and in this example a comparison of the similarity of the probability distributions 280, 282 will produce a similarity value that causes an anomaly situation to be determined to exist.

It will be understood that the alternate embodiment described above in relation to FIGS. 13 to 17 may be used in addition to or separately of the embodiments described in relation to FIGS. 1 to 12.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

It will be understood to persons skilled in the art of the invention that many modifications may be made without departing from the spirit and scope of the invention.

The invention claimed is:

1. An anomaly detection system for detecting an anomalous event associated with source data that conforms substantially to a natural power law when an anomalous event is not present, the anomaly detection system comprising one or more computer processors in communication with computer memory storing executable code structured to implement:
    a data grouping creator that produces a plurality of data groupings of data elements from a data group of data elements, the data group obtained from the source data, each data grouping:
        including data elements from the data group and less data elements than the data group;
        being different to each other data grouping; and
        including at least some data elements also present in at least one other data grouping;
    a power law goodness of fit tester that, for each of at least some of the data groupings:
        compares a power law profile obtained from the data grouping with a reference power law profile; and
        produces a goodness of fit value indicative of a similarity between the power law profile obtained from the data grouping and the reference power law profile; and
    a decision system that receives the produced goodness of fit values and outputs an indication as to whether the produced goodness of fit values are indicative of an anomalous event in the computing system.

2. The anomaly detection system as claimed in claim 1, wherein the power law profile obtained from the data grouping is a Zipf's Law profile and the reference power law profile is an ideal Zipf's Law profile corresponding to a power law profile that conforms to Zipf's Law, or the power law profile obtained from the data grouping is a Benford's Law profile and the reference power law profile is an ideal Benford's Law profile corresponding to a power law profile that conforms to Benford's Law.

3. The anomaly detection system as claimed in claim 1, wherein the system, for each of at least some of the data groupings:
  compares multiple power law profiles obtained from the data grouping with respective reference power law profiles; and
  produces a goodness of fit value indicative of the similarity between each power law profile obtained from the data grouping and the respective reference power law profile.

4. The anomaly detection system as claimed in claim 1, wherein the source data includes data indicative of at least one characteristic of network packets and/or data indicative of characters in at least one computer log.

5. The anomaly detection system as claimed in claim 1, wherein, when the decision system indicates that an anomalous event exists, the decision system outputs an indication as to the type of anomalous event using the produced goodness of fit values.

6. The anomaly detection system as claimed in claim 1, wherein the decision system determines whether an anomalous event exists using thresholding, decision trees, a random forest, and/or using a machine learning system and/or neural network that is trained to recognise patterns in the goodness of fit values that are indicative of normal source data and patterns in the goodness of fit values that are associated with an anomalous event.

7. The anomaly detection system as claimed in claim 6, wherein the decision system recognises specific patterns of goodness of fit values that are indicative of specific types of anomalous event.

8. The anomaly detection system as claimed in claim 1, wherein the anomaly detection system processes successive data groups of data elements from the source data and, for each data grouping associated with the data group:
  compares a power law profile obtained from the data grouping with a reference power law profile; and
  produces a goodness of fit value indicative of the similarity between the power law profile obtained from the data grouping and the reference power law profile; and
  the decision system determines whether an anomalous event exists after several data groups have been processed based on the produced goodness of fit values for all processed data groups.

9. An anomaly detection system for detecting an anomalous event associated with source data, the source data conforming substantially to a natural power law when an anomalous event is not present, the anomaly detection system comprising one or more computer processors in communication with computer memory storing executable code structured to implement:
  a data grouping creator that obtains successive data groups of data elements from the source data and, for each data group, produces a plurality of data groupings of data elements from the data group;
  a power law profile creator that produces a power law profile from data elements in each data grouping;
  a power law goodness of fit tester that produces a set of goodness of fit values for each data group by comparing the power law profile obtained from each data grouping with a reference power law profile, each goodness of fit value indicative of the similarity between the power law profile obtained from the data grouping and the reference power law profile;
  a distribution generator that produces a statistical distribution of goodness of fit values for each data group using the set of goodness of fit values obtained from the data groupings associated with the data group;
  a distribution similarity generator that produces a similarity value indicative of a similarity between a first statistical distribution associated with a first data group and a second statistical distribution associated with a different previous second data group; and
  an anomaly determiner that determines whether an anomalous event is likely to exist using the similarity value.

10. The anomaly detection system as claimed in claim 9, wherein the second data group is a data group immediately preceding the first data group in the source data.

11. The anomaly detection system as claimed in claim 9, wherein the power law profile obtained from each data grouping is a Zipf's Law profile or a Benford's Law profile.

12. The anomaly detection system as claimed in claim 9, wherein the source data includes data indicative of at least one characteristic of network packets.

13. The anomaly detection system as claimed in claim 9, wherein the statistical distribution is a probability distribution.

14. A method of detecting an anomalous event in a computing system, the method comprising:
  producing a plurality of data groupings of data elements from a data group of data elements, the data group obtained from source data conforming substantially to a natural power law when an anomalous event is not present, each data grouping:
    including data elements from the data group and less data elements than the data group;
    being different to each other data grouping;
    including at least some data elements also present in at least one other data grouping;
  for each of at least some of the data groupings:
    comparing a power law profile obtained from the data grouping with a reference power law profile; and
    producing a goodness of fit value indicative of a similarity between the power law profile obtained from the data grouping and the reference power law profile; and
  using a decision system to receive the produced goodness of fit values and output an indication as to whether the produced goodness of fit values are indicative of an anomalous event in the computing system.

15. The method as claimed in claim 14, comprising, for each of at least some of the data groupings:
  comparing multiple power law profiles obtained from the data grouping with respective reference power law profiles; and
  producing a goodness of fit value indicative of the similarity between each power law profile obtained from the data grouping and the respective reference power law profile.

16. The method as claimed in claim 14, wherein the source data includes data is indicative of at least one characteristic of network packets, and/or data indicative of characters in at least one computer log.

17. The method as claimed in claim 14, comprising, when the decision system indicates that an anomalous event exists, outputting an indication as to the type of anomalous event using the produced goodness of fit values.

18. The method as claimed in claim 17, comprising recognising specific patterns of goodness of fit values that are indicative of specific types of anomalous event.

19. The method of detecting an anomalous event associated with source data, the source data conforming substantially to a natural power law when an anomalous event is not present, the method comprising:

obtaining successive data groups of data elements from the source data and, for each data group, producing a plurality of data groupings of data elements from the data group;

producing a power law profile from data elements in each data grouping;

producing a set of goodness of fit values for each data group by comparing the power law profile obtained from each data grouping with a reference power law profile, each goodness of fit value indicative of the similarity between the power law profile obtained from the data grouping and the reference power law profile;

producing a statistical distribution of goodness of fit values for each data group using the set of goodness of fit values obtained from the data groupings associated with the data group;

producing a similarity value indicative of a similarity between a first statistical distribution associated with a first data group and a second statistical distribution associated with a different previous second data group; and determining whether an anomalous event is likely to exist using the similarity value.

20. The method as claimed in claim 19, wherein the second data group is a data group immediately preceding the first data group in the source data.

21. The method as claimed in claim 19, wherein the power law profile obtained from each data grouping is a Zipf's Law profile or a Benford's Law profile.

22. The method as claimed in claim 19, wherein the statistical distribution is a probability distribution.

* * * * *